(12) United States Patent
Funaki et al.

(10) Patent No.: US 6,646,043 B2
(45) Date of Patent: Nov. 11, 2003

(54) WATER DISPERSION TYPE WATER AND OIL REPELLENT COMPOSITION AND OBJECT TREATED WITH THE SAME

(75) Inventors: Hiroshi Funaki, Ichihara (JP); Takao Hirono, Ichihara (JP); Tomoko Sato, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/086,895

(22) Filed: Mar. 4, 2002

(65) Prior Publication Data

US 2002/0173585 A1 Nov. 21, 2002

(51) Int. Cl.$^7$ .............. C08F 2/16; C08F 2/32
(52) U.S. Cl. .............. 524/800; 524/801
(58) Field of Search .............. 524/800, 801

(56) References Cited

U.S. PATENT DOCUMENTS

| | | |
|---|---|---|
| 4,859,754 A | 8/1989 | Maekawa et al. |
| 5,057,577 A | 10/1991 | Matsuo et al. |
| 5,100,954 A | 3/1992 | Itoh et al. |
| 5,548,022 A | 8/1996 | Ito et al. |
| 5,578,688 A | 11/1996 | Ito et al. |
| 5,688,309 A | 11/1997 | Shimada et al. |
| 5,945,108 A | 8/1999 | Sugawara et al. |
| 6,177,531 B1 | 1/2001 | Shimada et al. |
| 6,207,777 B1 | 3/2001 | Shimada et al. |
| 6,251,984 B1 | 6/2001 | Shimada et al. |
| 6,261,695 B1 | 7/2001 | Kirimoto |
| 6,271,283 B1 | 8/2001 | Shimada et al. |
| 6,306,944 B1 | 10/2001 | Seki |
| 6,355,753 B1 | 3/2002 | Yamana et al. |

FOREIGN PATENT DOCUMENTS

| | | |
|---|---|---|
| EP | 0 756 033 | 1/1997 |
| EP | 1 174 417 | 1/2002 |
| WO | WO 94/24179 | 10/1994 |

OTHER PUBLICATIONS

Derwent Abstract of Japan, AN 1995–273315, XP–002204074, JP 07–173772, Jul. 11, 1995.
Derwent Abstract of Japan, AN 1994–313957, XP–002204075, JP 06–240239, Aug. 30, 1994.
Patent Abstracts of Japan, JP 04–080217, Mar. 13, 1992.
Patent Abstracts of Japan, JP 03–007745, Jan. 14, 1991.

*Primary Examiner*—Kriellion A. Sanders
(74) *Attorney, Agent, or Firm*—Oblon, Spivak, McClelland, Maier & Neustadt, P.C.

(57) ABSTRACT

A water dispersion type water and oil repellent composition containing a copolymer (A) which is a copolymer containing polymerized units based on a polymerizable monomer having a polyfluoroalkyl group and polymerized units based on stearyl (meth)acrylate, and which is produced by using a material having a purity of stearyl (meth)acrylate higher than 91 mass %, wherein the ratio of particles having an average particle diameter of from 30 to 150 nm is at least 80% of the total number of particles of the copolymer (A) in a dispersion medium.

20 Claims, No Drawings

WATER DISPERSION TYPE WATER AND OIL REPELLENT COMPOSITION AND OBJECT TREATED WITH THE SAME

The present invention relates to a water dispersion type water and oil repellent composition which is excellent in stability during storage and which can impart excellent water and oil repellency to an object to be treated, and an object treated with it.

It has been conventionally known that an aqueous dispersion having dispersed in an aqueous medium of a polymer containing polymerization units having polymerizable monomers having $R^f$ groups or a compound containing $R^f$ groups treats with fibers and imparts water and oil repellency on their surface. (JP-B-47-40467). It has been known that among various water and oil repellent compositions, a copolymer containing as the main components polymerized units of a polymerizable monomer having an $R^f$ group and a polymerizable monomer having a stearyl group (such as stearyl acrylate) provides more flexible touch and hand than a water and oil repellent composition which employs another polymerizable monomer (such as vinyl chloride).

However, of a conventional water and oil repellent composition, the difference between a specific gravity of stearyl (meth)acrylate (0.86 g/ml) and a specific gravity of a polymerizable monomer having an $R^f$ group (1.4–1.6 g/ml) is large, and thus it tends to be difficult to uniformly disperse these two polymerizable monomers in a polymerization medium, in a case where a copolymer is obtained by e.g. emulsion polymerization or suspension polymerization, and it may be necessary to employ a specific reactor or agitator or a pre-emulsification apparatus such as a high pressure emulsifier.

Further, when the polymerization is carried out without mixing stearyl acrylate with a polymerizable monomer having an $R^f$ group uniformly, there will be the fluctuation of the composition of the copolymer, thus decrease the water repellent performance. Further, a difference of specific gravity of dispersed compounds may cause instability of the water and oil repellent composition during storage and decrease chemical or mechanical stability of a processing bath.

Under these circumstances, it is an object of the present invention to improve uniform mixing properties of stearyl (meth)acrylate with a polymerizable monomer having an $R^f$ group and to achieve uniformalization of a copolymer composition, and to achieve improvement of storage stability of a water dispersion type water and oil repellent composition containing the above copolymer, improvement of initial water and oil repellency of an object treated with it, and improvement of a processing bath stability.

The present invention has been made to solve the above problems. The present inventors have conducted studies on uniform mixing of stearyl (meth)acrylate with a polymerizable monomer containing an $R^f$ group, and as a result, have found that the concentration of impurities in stearyl (meth)acrylate as a material greatly influences over uniform mixing properties of stearyl (meth)acrylate with a polymerizable monomer having an R group. As a result of further extensive studies, it has been found that the uniform mixing properties will be excellent when the purity of stearyl (meth)acrylate as a material is higher than 91 mass %. Particularly, it has been found that the uniform mixing properties are very excellent when the total amount of stearyl alcohol, a reaction product of stearyl (meth)acrylate and (meth)acrylic acid (impurity X), and a reaction product of stearyl (meth)acrylate and stearyl alcohol (impurity Y) is at most 9 mass % in stearyl (meth)acrylate as a material, and accomplished the present invention.

Namely, the present invention provides a water dispersion type water and oil repellent composition containing a copolymer (A) which has polymerized units based on a polymerizable monomer having an $R^f$ group and polymerized units based on stearyl (meth)acrylate, and which is produced by using a material having a purity of stearyl (meth)acrylate higher than 91 mass %, wherein the ratio of particles having an average particle diameter of from 30 to 150 nm is at least 80% of the total number of particles of the copolymer (A) in a dispersion medium.

Further, the present invention provides the above water dispersion type water and oil repellent composition, wherein the stearyl (meth)acrylate as the material contains an impurity (B) which is at least one member selected from the group consisting of stearyl alcohol, a reaction product of stearyl (meth)acrylate and (meth)acrylic acid (impurity X), and a reaction product of stearyl (meth)acrylate and stearyl alcohol (impurity Y).

Further, the present invention provides the above water dispersion type water and oil repellent composition, wherein the content of stearyl alcohol in stearyl (meth)acrylate as the material is at most 3 mass %.

Further, the present invention provides the above water dispersion type water and oil repellent composition, wherein the content of the impurity X in stearyl (meth)acrylate as the material is at most 2 mass %.

Further, the present invention provides the above water dispersion type water and oil repellent composition, wherein the content of the impurity Y in stearyl (meth)acrylate as the material is at most 4 mass %.

Further, the present invention provides the above water dispersion type water and oil repellent composition, wherein the polymerizable monomer having a polyfluoroalkyl group is a (meth)acrylate having a perfluoroalkyl group of the carbon number of from 4 to 20.

Further, the present invention provides an object treated with any one of the above water dispersion type water and oil repellent composition.

Now, the present invention will be described in detail with reference to the preferred embodiments.

In this specification, an acrylate and a methacrylate will generally be represented by (meth)acrylate, acrylic acid and methacrylic acid will generally be represented by (meth)acrylic acid, and acrylamide and methacrylamide will generally be represented by (meth)acrylamide.

The $R^f$ group is a group having at least two hydrogen atoms in an alkyl group substituted by fluorine atoms. The carbon number of the $R^f$ group is preferably from 2 to 20, particularly preferably from 6 to 16. The $R^f$ group may be of a linear structure or a branched structure, and a linear structure is particularly preferred. In the case of a branched structure, it is preferred that the branched portion is located at a terminal portion of the $R^f$ group, and has a short chain of from 1 to 4 carbon atoms.

The $R^f$ group may contain halogen atoms other than fluorine atoms. As such another halogen atom, a chlorine atom is preferred. Further, an etheric oxygen atom or a thioetheric sulfur atom may be inserted between a carbon—carbon bond in the $R^f$ group. The structure of the terminal portion of the $R^f$ group may, for example, be —$CF_2CF_3$, —$CF(CF_3)_2$, —$CF_2H$, —$CFH_2$ or —$CF_2Cl$, and —$CF_2CF_3$ is preferred.

The number of fluorine atoms in the $R^f$ group is preferably at least 60%, particularly preferably at least 80%, when represented by [(the number of fluorine atoms in the $R^f$ group)/(the number of hydrogen atoms contained in an alkyl group corresponding to the same carbon number as the $R^f$ group)]×100(%).

When the $R^f$ group is preferably a group having all the hydrogen atoms in an alkyl group substituted by fluorine atoms (i.e. perfluoroalkyl group) or a group having a perfluoroalkyl group at a terminal portion.

The carbon number of the perfluoroalkyl group is preferably from 2 to 20, particularly preferably from 6 to 16. If the carbon number of the perfluoroalkyl group is small, water repellency and oil repellency tend to decrease, and if the carbon number of the perfluoroalkyl group is large, handling of (meth)acrylate having the $R^f$ group tends to be difficult.

Specific examples of the $R^f$ group will be given below.

$C_4F_9$— [any one of structurally isomeric groups such as $F(CF_2)_4$—, $(CF_3)_2CFCF_2$—, $(CF_3)_3C$— and $CF_3CF_2(CF_3)CF$—], $C_5F_{11}$— [such as $F(CF_2)_5$—], $C_6F_{13}$— [such as $F(CF_2)_6$—], $C_7F_{15}$— [such as $F(CF_2)_7$—], $C_8F_{17}$— [such as $F(CF_2)_8$—], $C_9F_{19}$— [such as $F(CF_2)_9$—], $C_{10}F_{21}$— [such as $F(CF_2)_{10}$—], $C_{12}F_{25}$— [such as $F(CF_2)_{12}$—], $C_{14}F_{29}$— [such as $F(CF_2)_{14}$—], $C_{16}F_{33}$— [such as $F(CF_2)_{16}$—], $Cl(CF_2)_s$— (wherein s is an integer of from 2 to 20), $H(CF_2)_t$— (wherein t is an integer of from 2 to 20), $(CF_3)_2CF(CF_2)_y$— (wherein y is an integer of from 1 to 17), etc.

Specific examples of a case where the $R^f$ group is a group having an etheric oxygen atom or a thioetheric sulfur atom inserted between a carbon—carbon bond, will be given below.

$F(CF_2)_5OCF(CF_3)$—, $F[CF(CF_3)CF_2O]_rCF(CF_3)CF_2CF_2$—, $F[CF(CF_3)CF_2O]CCF(CF_3)$—, $F[CF(CF_3)CF_2O]_uCF_2CF_2$—, $F(CF_2CF_2CF_2O)_vCF_2CF_2$—, $F(CF_2CF_2O)_wCF_2CF_2$—, $F(CF_2)_5SCF(CF_3)$—, $F[CF(CF_3)CF_2S]_rCF(CF_3)CF_2CF_2$—, $F[CF(CF_3)CF_2S]CCF(CF_3)$—, $F[CF(CF_3)CF_2S]_uCF_2CF_2$—, $F(CF_2CF_2CF_2S)_vCF_2CF_2$—, $F(CF_2CF_2S)_wCF_2CF_2$— (wherein r is an integer of from 1 to 5, u is an integer of from 1 to 6, v is an integer of from 1 to 6, and w is an integer of from 1 to 9), etc.

The water dispersion type water and oil repellent composition of the present invention contains a copolymer (A) as an essential component.

The copolymer (A) is a copolymer containing polymerized units based on a polymerizable monomer having an $R^f$ group (hereinafter referred to as a polymerizable monomer ($a^1$)) and polymerized units based on stearyl (meth)acrylate.

The polymerizable monomer ($a^1$) is preferably a compound wherein the $R^f$ group is located at the alcohol residual portion of (meth)acrylate.

As the polymerizable monomer ($a^1$), preferred is a compound represented by the following formula $a^{11}$. In the formula $a^{11}$, $R^f$ represents an $R^f$ group, Q is a bivalent organic group, and R is a hydrogen atom or a methyl group.

$R^f$—Q—OCOCR=CH$_2$  Formula $a^{11}$ $R^f$ in the formula all is preferably an $R^f$ group containing no etheric oxygen atom or thioetheric sulfur atom, particularly preferably a perfluoroalkyl group, and most preferably perfluoroalkyl group having a linear structure. As the perfluoroalkyl group having a linear structure, a group represented by $F(CF_2)_n$— (wherein n is an integer of from 1 to 20, preferably an integer of from 4 to 16, particularly preferably an integer of from 6 to 12) is preferred.

Q in the formula $a^{11}$ is preferably —$(CH_2)_{p+q}$—, —$(CH_2)_pCONR^a(CH_2)_q$—, —$(CH_2)_pOCONR^a(CH_2)_q$—, —$(CH_2)_pSO_2NR^a(CH_2)_q$—, —$(CH_2)_pNHCONH(CH_2)_q$—, —$(CH_2)_pCH(OH)(CH_2)_q$—, —$(CH_2)_pCH(OCOR^a)(CH_2)_q$—, etc, wherein $R^a$ is a hydrogen atom or an alkyl group. Further, each of p and q which are independent of each other is an integer of at least 0, and p+q is an integer of from 1 to 22.

Further, Q in the formula $a^{11}$ is preferably —$(CH_2)_{p+q}$—, —$(CH_2)_pCONR^a(CH_2)_q$— or —$(CH_2)_pSO_2NR^a(CH_2)_q$—, wherein q is an integer of at least 2 and p+q is from 2 to 6, particularly preferably —$(CH_2)_{p+q}$— wherein p+q is from 2 to 6 (i.e. ethylene group to hexamethylene group). Further, it is preferred that fluorine atoms are bonded to the carbon atom of $R^f$ which is bonded to Q in formula $a^{11}$.

The following compounds may be mentioned as specific examples of the polymerizable monomer ($a^1$), wherein in the following compounds, R in the following compounds is a hydrogen atom or a methyl group.

$F(CF_2)_5CH_2OCOCR=CH_2$
$F(CF_2)_6CH_2CH_2OCOCR=CH_2$
$H(CF_2)_6CH_2OCOCR=CH_2$
$H(CF_2)_8CH_2OCOCR=CH_2$
$H(CF_2)_{10}CH_2OCOCR=CH_2$
$H(CF_2)_8CH_2CH_2OCOCR=CH_2$
$F(CF_2)_8CH_2CH_2CH_2OCOCR=CH_2$
$F(CF_2)_8CH_2CH_2OCOCR=CH_2$
$F(CF_2)_{10}CH_2CH_2OCOCR=CH_2$
$F(CF_2)_{12}CH_2CH_2OCOCR=CH_2$
$F(CF_2)_{14}CH_2CH_2OCOCR=CH_2$
$F(CF_2)_{16}CH_2CH_2OCOCR=CH_2$
$(CF_3)_2CF(CF_2)_4CH_2CH_2OCOCR=CH_2$
$(CF_3)_2CF(CF_2)_6CH_2CH_2OCOCR=C_2$
$(CF_3)_2CF(CF_2)_8CH_2CH_2OCOCR=CH_2$
$F(CF_2)_8SO_2n(C_3H_7)CH_2CH_2OCOCR=CH_2$
$F(CF_2)_8(CH_2)_4OCOCR=CH_2$
$F(CF_2)_8SO_2n(CH_3)CH_2CH_2OCOCR=CH_2$
$F(CF_2)_8SO_2n(C_2H_5)CH_2CH_2OCOCR=CH_2$
$F(CF_2)_8CONHCH_2CH_2OCOCR=CH_2$
$(CF_3)_2CF(CF_2)_5(CH_2)_3OCOCR=CH_2$
$(CF_3)_2CF(CF_2)_5CH_2CH(OCOCH_3)OCOCR=CH_2$
$(CF_3)_2CF(CF_2)_5CH_2CH(OH)CH_2OCOCR=CH_2$
$(CF_3)_2CF(CF_2)_7CH_2CH(OH)CH_2OCOCR=CH_2$
$F(CF_2)_9CH_2CH_2OCOCR=CH_2$
$F(CF_2)_9CONHCH_2CH_2OCOCR=CH_2$.

The copolymer (A) may contain one type or at least two types of the polymerized units based on the polymerizable monomer ($a^1$). When the copolymer (A) contains at least two types of the polymerized units based on the polymerizable monomer ($a^1$), at least two types of polymerized units based on (meth)acrylates having $R^f$ groups with different carbon numbers are preferably contained.

As the copolymer (A) of the present invention, it is preferably a copolymer containing one type of polymerized units based on the polymerizable monomer ($a^1$) and polymerized units based on stearyl (meth)acrylate, a copolymer containing at least two types of polymerized units based on the polymerizable monomer ($a^1$) and polymerized units based on stearyl (meth)acrylate, and a copolymer containing at least one type of polymerized units based on the polymerizable monomer ($a^1$), polymerized units based on stearyl (meth)acrylate and at least one type of polymerized units based on another polymerizable monomer (hereinafter referred to as a polymerizable monomer ($a^2$)) (hereinafter referred to as a copolymer ($A^1$)), particularly the copolymer ($A^1$) is preferred. The ratio of the polymerized units based on the polymerizable monomer ($a^1$) in the copolymer (A) is preferably from 50 to 99 mass %, particularly preferably from 55 to 98 mass %, from the viewpoint of water and oil repellency. In the copolymer ($A^1$), the ratio of the polymerized units based on the polymerizable monomer ($a^1$) is preferably from 50 to 99 mass %, particularly preferably from 55 to 98 mass %, from the viewpoint of water and oil repellency, and the ratio of polymerized units based on stearyl (meth)acrylate is preferably from 1 to 50 mass %, particularly preferably from 2 to 45 mass %.

Stearyl (meth)acrylate may be stearyl acrylate alone, stearyl methacrylate alone or a combination thereof.

As the polymerizable monomer ($a^2$), it is preferred that a polymerizable monomer has one or two polymerizable unsaturated groups, particularly it is preferred that a polymerizable monomer has one polymerizable unsaturated group. Further, the copolymer ($A^1$), may contain one type or at least two types of polymerized units based on the polymerizable monomer ($a^2$).

The copolymer ($A^1$) preferably contains at least one type of the polymerized units based on the polymerizable monomer ($a^2$) the polymerizable monomer ($a^2$) is preferably at least one member selected from the following polymerizable monomers.

The polymerizable monomer ($a^2$) may be an olefin, vinyl carboxylate, styrene, a substituted styrene, (meth)acrylamide, an N-substituted (meth)acrylamide, an alkyl vinyl ether, a (substituted alkyl) vinyl ether, a vinyl alkyl ketone, a diene, glycidyl (meth)acrylate, aziridinyl (meth)acrylate, a substituted alkyl (meth)acrylate, a hydroxyalkyl (meth)acrylate, a hydroxyl group terminal polyoxyalkylene (meth)acrylate, an alkoxy group terminal polyoxyalkylene (meth)acrylate, a polyoxyalkylene di(meth)acrylate, a polysiloxane group-containing (meth)acrylate, triallyl cyanurate, allyl glycidyl ether, allyl carboxylate, N-vinyl carbazole, N-methylmaleimide, maleic anhydride, a maleic monoalkyl ester, a maleic dialkyl ester or a blocked isocyanurate group-containing (meth)acrylic ester.

Further, the polymerizable monomer ($a^2$) may, for example, be preferably vinyl acetate, styrene, α-methylstyrene, p-methylstyrene, glycidyl (meth)acrylate, (meth)acrylamide, N,N-dimethyl (meth)acrylamide, diacetone (meth)acrylamide, methylol diacetone (meth)acrylamide, N-methylol (meth)acrylamide, a vinyl alkyl ether, a halogenated alkyl vinyl ether, a vinyl alkyl ketone, aziridinyl ethyl (meth)acrylate, benzyl (meth)acrylate, aziridinyl (meth)acrylate, 2-hydroxyethyl (meth)acrylate, a polyoxyalkylene (meth)acrylate, a methylpolyoxyalkylene (meth)acrylate, 2-ethylhexylpolyoxyalkylene (meth)acrylate, a polyoxyalkylene di(meth)acrylate, (meth)acrylate having polysiloxane, triallyl cyanurate, allyl glycidyl ether, allyl acetate, 2-hydroxy-3-chloropropyl (meth)acrylate, N-vinylcarbazole, maleimide, N-methylmaleimide or (2-dimethylamino)ethyl (meth)acrylate.

In the present invention, the copolymer (A) is preferably dispersed as particles in the composition. The average particle diameter of the particles is preferably from 10 to 1,000 nm, more preferably from 10 to 300 nm, particularly preferably from 10 to 200 nm. Further, with respect to the particles of the copolymer (A), the ratio of particles having an average particle diameter of from 30 to 150 nm is preferably at least 80%, more preferably at least 90%, particularly preferably at least 95%, of the total number of particles. If the average particle diameter is smaller, it may be necessary to add a large amount of surfactants in order to improve stability of the composition, thus it causes a decrease in water and oil repellency or color fading of a treated object. On the contrary, when the average particle diameter is too large, there is fear that the copolymer (A) may precipitate.

The average particle diameter can be measured by e.g. a dynamic light scattering apparatus, an electron microscope or capillary hydrodynamic fluctuation (hereinafter referred to as CHDF). When polymerization is carried out in the presence of a surfactant by a conventional emulsion polymerization method as mentioned hereinafter, the average particle diameter is within the above range.

With respect to stearyl (meth)acrylate to be used in the present invention, the concentration of the impurity (B) derived from the material of it is at most 9 mass %, preferably at most 6 mass %, particularly preferably at most 4 mass %, in the material stearyl (meth)acrylate as the raw material.

When the concentration of the impurity (B) exceeds 9 mass %, the uniform mixing properties of the polymerizable monomer ($a^1$) with stearyl (meth)acrylate tend to become worse, the fluctuation of the copolymer composition of the copolymer (A) tends to be significant, and e.g. storage stability and water and oil repellency of the water and oil repellent composition tend to become worse.

The reason why the uniform mixing properties become worse is not clearly understood, but it is considered that a thermodynamic balance in the prepolymerization fluid is disturbed by the presence of an impurity, and formation of uniform monomer oil droplets before the polymerization reaction is inhibited. It is considered that, as a result, no copolymer having a uniform composition can be produced, and water and oil repellency decreases or particles precipitate due to formation of particles having a heavy specific gravity.

As an analysis method of stearyl (meth)acrylate, capillary gas chromatography may be employed. It is considered that three types of impurities such as stearyl alcohol, the impurity X and the impurity Y which are determined by the following analytical method have a particularly bad influence on polymerization. Especially the impurity Y has bad influence.

Analytical method: Capillary gas chromatography

Analytical conditions: Capillary column tube; DB-5HT (30 m×film thickness 0.1 μm), injection temperature; 300° C., detector temperature; 380° C., gas flow rate; 25 psi, split ratio; 100 to 1, amount of sample injected; 0.5 μl, sample solution; 10 mass % chloroform solution, temperature of column oven; held at 40° C. for 1 minute, then increased to 170° C. at a rate of 20° C. per minute, held at 170° C. for 5 minutes, and then increased to 380° C. at a rate of 20° C. per minute, and held at 380° C. for 5 minutes.

Further, because stearyl alcohol reacts with stearyl (meth)acrylate with time passing to form the impurity Y, so it is necessary to pay attention to the content of stearyl alcohol in stearyl (meth)acrylate.

Among these three impurities, the stearyl alcohol is considered to be an unreacted material in synthesis of stearyl (meth)acrylate, and the impurities X and Y are considered to be by-products formed due to inappropriate reaction conditions in synthesis of stearyl (meth)acrylate.

Examples of the impurity X include the following compounds.

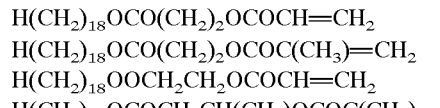

Examples of the impurity Y include the following compounds.

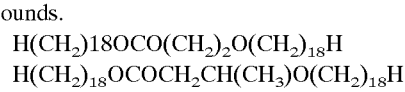

As a method for removing these impurities, a method of removing them by purification such as distillation or recrystallization after synthesis of stearyl (meth)acrylate, or a method of optimizing reaction conditions of the synthesis of stearyl (meth)acrylate to increase the conversion of stearyl alcohol with controlling the stearyl alcohol not to react with (meth)acrylic acid or stearyl (meth)acrylate, may be considered.

In either method, the amount of stearyl alcohol is at most 3 mass %, particularly preferably at most 1 mass %, of the stearyl (meth)acrylate. Further, the amount of the impurity X is preferably at most 2 mass %, particularly preferably at most 1 mass %, of the stearyl (meth)acrylate. Further, the amount of the impurity Y is preferably at most 4 mass %, particularly preferably at most 2.5 mass %, of the stearyl (meth)acrylate. Particularly, the total amount of three impurities stearyl alcohol, impurity X and impurity Y is at most 4 mass % of the stearyl (meth)acrylate.

The stearyl (meth)acrylate to be used in the present invention has a purity of preferably higher than 91 mass %, particularly preferably from 94 to 100 mass %, most preferably from 96 to 100 mass %, as analyzed by the above-described capillary gas chromatography.

The method for producing the copolymer (A) of the present invention is not particularly limited. Preferably, the polymerizable monomer having an $R^f$ group and stearyl (meth)acrylate are polymerized in an aqueous medium by a well known method such as an emulsion polymerization or a dispersion polymerization. In a case of polymerization by an emulsion polymerization method or a dispersion polymerization method, it may be mentioned that, for example, an initiator is added in the presence of a surfactant and a polymerization medium. As the surfactant, at least one of nonionic, cationic, anionic and amphoteric surfactants may be employed. The amount of the surfactant is preferably from 0.5 to 20 parts by mass based on 100 parts by mass of the copolymer (A), preferably from 1 to 15 parts by mass from the viewpoint of water and oil repellency and dispersion stability, particularly preferably from 5 to 12 parts by mass.

Specific examples of the surfactant will be given below, but the surfactant is not limited thereto. Further, in the following examples of the surfactant, the alkyl group portion such as an octadecyl group may be an alkenyl group portion such as an oleyl group.

The nonionic surfactant may, for example, be an alkylphenyl polyoxyethylene, an alkylpolyoxyethylene, an alkylpolyoxyalkylene polyoxyethylene, a fatty acid ester, an alkylamine oxyethylene addition product, an alkanoic amide oxyethylene addition product, an alkylamine oxyethylene oxypropylene addition product, an alkylamine oxide, or a compound having a carbon—carbon triple bond and a hydroxyl group in its molecule (specific examples: e.g. Surfynol 420, Surfynol 465, Surfynol 485, etc., manufactured by NISSIN CHEMICAL INDUSTRY CO., LTD.).

The alkylphenyl polyoxyethylene may, for example, be nonylphenyl polyoxyethylene or octylphenyl polyoxyethylene.

The alkyl portion in the alkylpolyoxyethylene may be a linear or branched saturated fatty acid group having a carbon number of from 4 to 26, and specific examples thereof include an octyl group, a dodecyl group, a tetradecyl group, a hexadecyl group, an octadecyl group, a behenyl group and a secondary alkyl group.

The alkylpolyoxyalkylene polyoxyethylene may, for example, be alkylpolyoxypropylene polyoxyethylene or alkylpolyoxybutylene polyoxyethylene, and the alkyl portion may be the same alkyl portion as mentioned above.

The cationic surfactant may, for example, be an amine salt, a quaternary ammonium salt or an oxyethylene addition type ammonium salt, and specific examples thereof include an alkyldimethylamine hydrochloride, a dialkylmethylamine hydrochloride, an alkyltrimethylammonium chloride, a dialkyldimethylammonium chloride, a monoalkylamine acetate and an alkylmethyldipolyoxyethylene ammonium chloride. The alkyl portion may be the same alkyl portion as mentioned above.

The anionic surfactant may, for example, be a fatty acid salt, an α-olefin sulfonate, an alkylbenzene sulfonate or its salt, an alkylsulfate, an alkyl ether sulfate, an alkyl phenyl ether sulfate, an N-acylmethyl taurine salt or an alkylsulfosuccinate.

The amphoteric surfactant may, for example, be an alanine, an imidazolinium betaine, an amidebetaine, or acetic betaine, and specific examples thereof include lauryl betaine, stearyl betaine, laurylcarboxymethylhydroxyethyl imidazolinium betaine, lauryldimethylamino acetic betaine and fatty acid amidepropyldimethylamino acetic betaine.

The polymerization medium is preferably an aqueous medium containing water, and an organic solvent may be contained in the aqueous medium as the case requires. As the organic solvent, a water-soluble organic solvent is preferred, and an organic solvent such as an ester type, a ketone type or an ether type is preferred. The ratio of water to the organic solvent is not particularly limited.

Specific examples of the organic solvent include acetone, ethylene glycol monoethyl ether monoacetate, ethylene glycol monoethyl ether, ethylene glycol monomethyl ether, ethylene glycol monobutyl ether, propylene glycol monomethyl ether, propylene glycol monomethyl ether monoacetate, dipropylene glycol monomethyl ether, tripropylene glycol monomethyl ether, propylene glycol dibutyl ether, ethyl 3-ethoxypropionate, 3-methoxy-3-methyl-1-butanol, 2-t-butoxyethanol, isopropyl alcohol, n-butyl alcohol, isobutyl alcohol, ethyl alcohol, ethylene glycol, propylene glycol, dipropylene glycol, tripropylene glycol and tetrapropylene glycol.

As the polymerization initiator, a water-soluble or oil-soluble polymerization initiator may be used, and a general purpose initiator of e.g. an azo type, a peroxide type or a redox type may be used depending upon the polymerization temperature. The polymerization initiator is preferably a water-soluble initiator, particularly preferably a salt of an azo type compound.

The polymerization temperature is not particularly limited, but is preferably from 20 to 150° C.

In the polymerization reaction of the polymerizable monomer, a chain transfer agent may be incorporated with a purpose of controlling the molecular weight. The chain transfer agent is preferably an aromatic compound or a mercaptan, particularly preferably an alkyl mercaptan. As specific examples of the chain transfer agent, n-octyl mercaptan, n-dodecyl mercaptan, t-dodecyl mercaptan, stearyl mercaptan and a-methylstyrene diner $CH_2=CPhCH_2C(CH_3)_2Ph$ [Ph is a phenyl group], may be preferably mentioned.

As a preliminary step to initiation of the polymerization, a mixture comprising the polymerizable monomer, the surfactant and the aqueous medium may be preliminarily dispersed by a homomixer or a high pressure emulsifier. By agitating the mixture well before initiation of the polymerization, such effects can be obtained that the yield of the polymer to be obtained finally is improved, and the fluctuation width of the average particle diameter of the polymer particles can be narrowed.

The surfactant may be added at the time of the emulsion polymerization and/or after the emulsion polymerization.

The water dispersion type water and oil repellent composition of the present invention is a composition having the copolymer (A) dispersed in an aqueous medium. The composition may be prepared by dispersing the copolymer (A) in a desired aqueous medium, but usually, a desired medium is employed as the polymerization medium in the polymerization reaction to directly prepare the water dispersion type water and oil repellent composition.

The aqueous medium is preferably water or a medium containing water and an organic solvent. The organic solvent may be one similar to the organic solvents as disclosed as the polymerization medium in the above method for producing the copolymer (A). The content of the organic solvent is preferably at most 40 mass % based on the weight of the copolymer (A).

The amount of the copolymer (A) is preferably from 1 to 50 mass % based on the aqueous medium, but the concentration may optionally be changed depending upon the purpose of use or the preparation mode of the composition.

The water dispersion type water and oil repellent composition of the present invention is excellent in water and oil repellency, and it is thereby useful as a water dispersion for water and oil repellent. The water dispersion may be diluted to an optional concentration depending upon the particular purpose or application and then applied to an object to be treated. The application method to an object to be treated may also be optional depending upon the type of the object to be treated, the formulation of the composition, etc. For example, a method may be mentioned wherein it is deposited on the surface of the object to be treated by a covering method such as dip coating, followed by drying. Further, if necessary, it may be applied together with a suitable crosslinking agent, and curing may be carried out.

The water dispersion type water and oil repellent composition of the present invention exhibits excellent stability and excellent durability in water and oil repellency, even if it is used together with another compound, and accordingly an additive such as another polymer blender, another water repellent, an oil repellent, an insecticide, a flame retardant, an antistatic agent, a dye stabilizer or an anticrease agent may be used together as the case requires.

The water dispersion type water and oil repellent composition of the present invention may be applied to an object to be treated at an optional concentration. For treatment of the object to be treated, dipping is preferred, and further, it is preferred to carry out drying. Further, curing may be carried out as the case requires. The dipping time is preferably from 1 to 10 seconds, and the time may optionally be changed depending upon the object to be treated.

The object to be treated with the water dispersion type water and oil repellent composition of the present invention is not particularly limited, and it may, for example, be fiber fabrics, glass, paper, wood, leather, fur, asbestos, brick, cement, a metal or its oxide, a ceramic, a sealing agent or a plastic, and preferred are fiber fabrics and paper.

The fibers or fiber fabrics may, for example, be animal or plant natural fibers such as cotton, hemp, wool and silk, synthetic fibers such as polyamide, polyester, polyvinyl alcohol, polyacrylonitrile, polyvinyl chloride and polypropylene, semisynthetic fibers such as rayon and acetate, inorganic fibers such as glass fibers, carbon fibers and asbestos fibers, and fabrics of mixed fibers thereof.

Now, the present invention will be explained in further detail with reference to Examples. However, it should be understood that the present invention is by no means restricted to such specific Examples.

The average particle diameter in Examples were measured by means of a CHDF method ("CHDF2000" manufactured by MATEC SCIENCE). As a high pressure emulsifier, a high pressure homogenizer manufactured by Manton-Gaulin was employed.

Further, symbols in Examples have the following meanings.

FA: $F(CF_2)_mCH_2CH_2COCH=CH_2$ (a mixture of compounds wherein m is 6, 8, 10, 12, 14 and 16, and the average of m is 9)
StA: Stearyl acrylate
NMAM: N-methylolacrylamide
DOM: Dioctyl maleate
HEA: Hydroxyethyl acrylate
DPG: Dipropylene glycol
PEOOE: (Polyoxyethylene)oleyl ether
StTMAC: Stearyl trimethylammonium chloride
PEONPE: Polyoxyethylene mono(nonylphenyl) ether
HDEO: Polyoxyethylene mono(hexadecyl) ether
PEOLE: Polyoxyethylene mono (2-dodecyl) ether,
StSH: Stearylmercaptan
DOSH: n-Dodecylmercaptan

EXAMPLE 1

154 g of FA, 90 g of StA (purity as measured by capillary gas chromatography: 98 mass %, concentration of stearyl alcohol: 0.4 mass %, concentration of impurity X: 0.4 mass %, concentration of impurity Y: 1.0 mass %), 10 g of HEA, 0.77 g of StSH, 15.4 g of PEOOE, 5.1 g of StTMAC, 90 g of DPG and 320 g of deionized water were stirred in a 1 l glass autoclave at 50° C. for 30 minutes.

Then, 0.5 g of an azo type polymerization initiator ("V-50" tradename, manufactured by Wako Pure Chemical Industries, Ltd.) was added thereto, and the atmosphere in the autoclave was substituted by nitrogen. Further, the temperature was increased to 60° C. with stirring to polymerize for 6 hours, to obtain a milk-white emulsion 1 having a solid content concentration of 38.4 mass % and an average particle diameter of the polymer of 110 nm (the number of particles having an average particle diameter of from 30 to 150 nm was 98.5% of the total number of particles).

EXAMPLE 2

Into a 1 l glass reactor equipped with a stirrer, 100 g of FA, 68 g of StA (purity measured by capillary gas chromatography: 98 mass %, concentration of stearyl alcohol: 0.4 mass %, concentration of impurity X: 0.4 mass %, concentration of impurity Y: 1.0 mass %), 15.5 g of DOM, 6.0 g of NMAA, 0.5 g of DOSH, 12.0 g of PEONPE, 2.4 g of StTMAC, 3.6 g of HDEO, 418 g of deionized water and 71.7 g of DPG were put, followed by stirring at 40° C. for 30 minutes, and the mixture was treated with high pressure emulsification by means of a high pressure emulsifier while keeping it at a temperature of from 40 to 50° C. under 200 kg/cm$^2$ to obtain an emulsion.

This emulsion was poured into a 1 l glass autoclave, and the atmosphere in the autoclave was substituted by nitrogen. Further, 50.2 g of VCL was added thereto, and then 2.4 g of an azo type polymerization initiator ("VA-046B", tradename, manufactured by Wako Pure Chemical Industries, Ltd.) was added thereto. The temperature was increased to 50° C., and the mixture was polymerized for 15 hours to obtain a milk-white emulsion 2 having a solid content concentration of 32 mass % and an average particle diameter of polymer particles of 105 nm (the number of particles having an average particle diameter of from 30 to 150 nm was 99.8% of the total number of particles).

EXAMPLE 3

A milk-white emulsion 3 having a solid content concentration of 36.3 mass % and an average particle diameter of the polymer of 140 nm (the number of particles having an average particle diameter of from 30 to 150 nm was 75.2% of the total number of particles) was obtained in the same condition as described in Example 1 except that as StA, one having a purity of 89 mass % as measured by capillary gas chromatography, a concentration of stearyl alcohol of 3.5 mass %, a concentration of impurity X of 2.3 mass % and a concentration of impurity Y of 4.6 mass % was used.

EXAMPLE 4

A milk-white emulsion 4 having a solid content concentration of 29.8 mass % and an average particle diameter of the polymer of 120 nm (the number of particles having an average particle diameter of from 30 to 150 nm was 79.8% of the total number of particles) was obtained in the same condition as described in Example 2 except that as StA, one having a purity of 89 mass % as measured by capillary gas chromatography, a concentration of stearyl alcohol of 3.5 mass %, a concentration of impurity X of 2.3 mass % and a concentration of impurity Y of 4.6 mass % was used.

Preparation of Treating Agents 1 to 4

Deionized water was added to each of the emulsions 1 to 4 obtained in Examples 1 to 4, to prepare treating agents 1 to 4 having a solid content concentration of 20 mass %.

Evaluation of Water Repellency

Evaluation was carried out by a spray test of JIS L-1092-986.2, and represented by the water repellency grades as identified in Table 1. The shower water temperature was usually 27° C.

TABLE 1

| Water repellency ratings | State |
| --- | --- |
| 5 | No wettability observed on the surface |
| 4 | Slight wettability observed on the surface |
| 3 | Partial wettability observed on the surface |
| 2 | Wettability observed on the surface |
| 1 | Wettability observed over the entire surface |

Measurement of Storage Stability 100 g of each of the treating agents 1 to 4 was collected in a glass bottle of 100 ml capable of sealing, sealed and left to stand at a temperature of 60° C. at a humidity of 80% for 1 month. Each treating agent after the test was filtrated with a filter paper of 5C, the weight of the precipitated solid material collected by filtration was measured, and the ratio was obtained. The results are shown in Table 2.

Measurement of Water Repellency 0.15 g of each of the treating agents 1 to 4 was collected in a polybeaker of 100 ml, and 29.85 g of deionized water was added thereto, followed by thorough stirring to obtain a test solution.

A test cloth (nylon taffeta: subjected to coloring and treatment with a dye-fixing agent) cut into 20 cm×20 cm was dipped in the test solution (30 ml) contained in a bat in such a state that the cloth was spread, then the cloth was taken out, squeezed by a mangle (1 dip-1 nip: wet pick up 29.5%), dried at 110° C. for 1 minute, and cured at 170° C. for 1 minute. The water repellency of this treated cloth was measured by the above method. The results are shown in Table 2.

Measurement of Processing Bath Stability 5 g of each of the treating solutions 1 to 4 was collected in a bottle of 100 ml which can be sealed, and 95 g of deionized water was added thereto, followed by thorough stirring to make the mixture uniform, then the container was sealed and left to stand at a temperature of 40° C. at a humidity of 80% for 1 week. The test solution after the test was filtered with a filter paper of 5C, the mass of the precipitated solid material collected by filtration was measured, and the ratio was obtained. The results are shown in Table 2.

TABLE 2

| Examples | 1 | 2 | 3 | 4 |
| --- | --- | --- | --- | --- |
| Storage stability (%) | 0.2 | 0.1 | 0.7 | 0.9 |
| Water repellency | 5 | 5 | 4 | 4 |
| Processing bath stability (%) | <trace | <trace | 0.2 | 0.2 |

The water dispersion type water and oil repellent composition of the present invention has an excellent storage stability. Further, the composition of the present invention can impart excellent water repellency to an object to be treated, even if the object to be treated is treated at an extremely low concentration. Further, the water dispersion type water and oil repellent composition of the present invention is excellent in processing bath stability. In the present invention, use of a material having a small amount of impurities to improvement of stability of the water dispersion type water and oil repellent composition to be obtained. Namely, the water dispersion type water and oil repellent composition of the present invention is an extremely excellent composition in actual use.

The entire disclosure of Japanese Patent Application No. 2001-60977 filed on Mar. 5, 2001 including specification, claims and summary are incorporated herein by reference in its entirety.

What is claimed is:

1. A water dispersion type water and oil repellent composition comprising particles of a copolymer (A) dispersed in water, wherein the copolymer (A) is prepared by polymerizing a polymerizable monomer having a polyfluoroalkyl group and stearyl (meth)acrylate, and the stearyl (meth)acrylate has a purity of more than 91 mass %, and the ratio of particles having an average particle diameter of from 30 to 150 nm is at least 80% of the total number of particles of the copolymer (A) in the dispersion.

2. The water dispersion composition according to claim 1, wherein the stearyl (meth)acrylate has an impurity (B) which is at least one member selected from the group consisting of stearyl alcohol, a reaction product of stearyl (meth)acrylate and (meth)acrylic acid (impurity X) and a reaction product of stearyl (meth)acrylate and stearyl alcohol (impurity Y).

3. The water dispersion composition according to claim 2, wherein the impurity (B) comprises stearyl alcohol in an amount of at most 3 mass %.

4. The water dispersion composition according to claim 2, wherein the impurity comprises impurity X in in an amount of at most 2 mass %.

5. The water dispersion composition according to claim 2, wherein the impurity comprises impurity Y in an amount of at most 4 mass %.

6. The water dispersion composition according to claim 1, wherein the polymerizable monomer having a polyfluoroalkyl group is a (meth)acrylate having a perfluoroalkyl group, and the carbon number of the polyfluoroalkyl group is from 4 to 20.

7. The water dispersion composition according to claim 2, wherein the polymerizable monomer having a polyfluoroalkyl group is a (meth)acrylate having a perfluoroalkyl group and the carbon number of the polyfluoroalkyl group is from 4 to 20.

8. An object treated with the water dispersion composition of claim 1.

9. The composition according to claim 1, wherein the polyfluoroalkyl group is an alkyl group substituted by fluorine atoms and at least two hydrogen atoms.

10. The composition of claim 9, wherein the carbon number of the polyfluoroalkyl group is from 2 to 20.

11. The composition of claim 2, wherein the polyfluoroalkyl group is an alkyl group substituted by fluorine atoms and at least two hydrogen atoms.

12. The composition of claim 11, wherein the polyfluoroalkyl group has a carbon number of from 2 to 20.

13. The composition of claim 1, wherein the polyfluoroalkyl group is an alkyl group substituted by fluorine atoms and halogen atoms other than fluorine atoms.

14. The composition of claim 2, wherein the polyfluoroalkyl group is an alkyl group substituted by fluorine atoms and halogen atoms other than fluorine atoms.

15. The composition of claim 1, wherein the polyfluoroalkyl group has an etheric oxygen atom or a thioetheric sulfur atom inserted between a carbon—carbon bond in the polyfluoroalkyl group.

16. The composition of claim 2, wherein the polyfluoroalkyl group has an etheric oxygen atom or a thioetheric sulfur atom inserted between a carbon—carbon bond in the polyfluoroalkyl group.

17. The composition of claim 1, wherein the number of fluorine atoms in the polyfluoroalkyl group is at least 60%, calculated by (the number of fluorine atoms in the polyfluoroalkyl group)/(the number of hydrogen atoms contained in an alkyl group corresponding to the same carbon number as the polyfluoroalkyl group)×100%.

18. The composition of claim 2, wherein the number of fluorine atoms in the polyfluoroalkyl group is at least 60%, calculated by (the number of fluorine atoms in the polyfluoroalkyl group)/(the number of hydrogen atoms contained in an alkyl group corresponding to the same carbon number as the polyfluoroalkyl group)×100%.

19. The composition of claim 1, wherein the copolymer (A) further comprises a polymerizable monomer having one or two polymerizable unsaturated groups.

20. The composition of claim 2, wherein the copolymer (A) further comprises a polymerizable monomer having one or two polymerizable unsaturated groups.

* * * * *

UNITED STATES PATENT AND TRADEMARK OFFICE
CERTIFICATE OF CORRECTION

PATENT NO.    : 6,646,043 B2  Page 1 of 1
DATED         : November 11, 2003
INVENTOR(S)   : Funaki et al.

It is certified that error appears in the above-identified patent and that said Letters Patent is hereby corrected as shown below:

<u>Title page,</u>
Item [30], Foreign Application Priority Data, has been omitted and should read:

-- [30]    Foreign Application Priority Data

Mar. 5, 2001  (JP) ………………………. 2001-060977 --

Signed and Sealed this

Seventeenth Day of February, 2004

JON W. DUDAS
*Acting Director of the United States Patent and Trademark Office*